US012560817B2

(12) United States Patent
Jadidian et al.

(10) Patent No.: US 12,560,817 B2
(45) Date of Patent: Feb. 24, 2026

(54) COLOR IMAGERY IN EXTREMELY LOW LIGHT CONDITIONS FOR A HEAD MOUNTED DISPLAY

(71) Applicant: Rivet Industries, Inc., Washington, DC (US)

(72) Inventors: Jouya Jadidian, Los Gatos, CA (US); Calin Cristian, Iasi (RO); Seyedsohrab Madani, Menlo Park, CA (US); Mohit Narang, Cupertino, CA (US)

(73) Assignee: Rivet Industries, Inc., Washington, DC (US)

( * ) Notice: Subject to any disclaimer, the term of this patent is extended or adjusted under 35 U.S.C. 154(b) by 0 days.

(21) Appl. No.: 19/072,793

(22) Filed: Mar. 6, 2025

(65) Prior Publication Data

US 2025/0347914 A1 Nov. 13, 2025

Related U.S. Application Data

(60) Provisional application No. 63/646,341, filed on May 13, 2024.

(51) Int. Cl.
G02B 27/01 (2006.01)
G06T 5/70 (2024.01)
(Continued)

(52) U.S. Cl.
CPC ............ G02B 27/0172 (2013.01); G06T 5/70 (2024.01); G06T 7/143 (2017.01); G06V 20/20 (2022.01);
(Continued)

(58) Field of Classification Search
CPC ........ G02B 27/0172; G02B 2027/0112; G02B 2027/0138; G02B 2027/014;
(Continued)

(56) References Cited

U.S. PATENT DOCUMENTS 8,422,999 B1 * 4/2013 Harris ............... H04M 1/72403
382/229
11,375,166 B2 * 6/2022 Paul ....................... H04N 23/90
(Continued)

FOREIGN PATENT DOCUMENTS

CN 112990215 A 6/2021

OTHER PUBLICATIONS

Author Unknown, "Ashish Vaswani," Google Scholar, first publication date unknown. Retrieved on Oct. 3, 2025 from the Internet at URL: https://scholar.google.com/citations?user=oR9sCGYAAAAJ &hl=en; 8 pages.

(Continued)

*Primary Examiner* — Grant Sitta
(74) *Attorney, Agent, or Firm* — COOLEY LLP

(57) ABSTRACT

In an embodiment, a method includes receiving a first image captured via a head-mounted display (HMD) under a low light condition. The method further includes applying at least one of a denoising technique or a filtering technique to the first image to generate a first modified image. The method further includes identifying a first object in the first modified image. The method further includes, in response to determining that the first object does not have a color assignment, assigning a first color to the first object at the first modified image. The method further includes, in response to determining that the first object is assigned the first color at the first modified image, assigning the first color to the first object at a second modified image.

19 Claims, 9 Drawing Sheets
(3 of 9 Drawing Sheet(s) Filed in Color)

(51) Int. Cl.

| | |
|---|---|
| *G06T 7/143* | (2017.01) |
| *G06V 20/20* | (2022.01) |
| *G06V 20/40* | (2022.01) |
| *G06V 20/64* | (2022.01) |

(52) U.S. Cl.
CPC .............. *G06V 20/41* (2022.01); *G06V 20/64* (2022.01); *G02B 2027/0112* (2013.01); *G02B 2027/0138* (2013.01); *G02B 2027/014* (2013.01); *G02B 2027/0178* (2013.01); *G06T 2207/10024* (2013.01); *G06T 2207/30196* (2013.01)

(58) Field of Classification Search
CPC ... G02B 2027/0178; G06T 5/70; G06T 7/143; G06T 2207/10024; G06T 2207/30196; G06V 20/20; G06V 20/41; G06V 20/64
See application file for complete search history.

(56) References Cited

U.S. PATENT DOCUMENTS

| | | | | |
|---|---|---|---|---|
| 11,887,283 | B2 * | 1/2024 | Zhou | G06T 3/12 |
| 11,892,624 | B2 * | 2/2024 | Price | A63F 13/25 |
| 2016/0093034 | A1 | 3/2016 | Beck et al. | |
| 2016/0238852 | A1 | 8/2016 | Ellsworth et al. | |
| 2017/0351935 | A1 | 12/2017 | Liu et al. | |
| 2018/0027181 | A1 * | 1/2018 | Roulet | G06T 5/70 |
| | | | | 348/38 |
| 2019/0385325 | A1 | 12/2019 | Kweon et al. | |
| 2020/0041276 | A1 | 2/2020 | Chakravarty et al. | |
| 2020/0341563 | A1 * | 10/2020 | Poore | G06F 3/0346 |
| 2021/0027207 | A1 | 1/2021 | Bongio Karrman et al. | |
| 2021/0133932 | A1 * | 5/2021 | Lee | G06T 5/70 |
| 2021/0373336 | A1 * | 12/2021 | Price | G02B 27/0172 |
| 2023/0042217 | A1 * | 2/2023 | Scales | G02B 27/0176 |
| 2023/0055581 | A1 * | 2/2023 | Bidstrup | H04N 7/181 |
| 2023/0319401 | A1 * | 10/2023 | Feng | G06T 7/50 |
| | | | | 348/241 |
| 2025/0086754 | A1 * | 3/2025 | Bleyer | G06T 5/70 |

OTHER PUBLICATIONS

Laga, H. et al., "A Survey on Deep Learning Techniques for Stereo-based Depth Estimation," arXiv:2006.02535v1 [cs.CV], (Jun. 1, 2020); 28 pages.
Vaswani, A. et al., "Attention Is All You Need," arXiv:1706. 03762v1 [cs.CL], (Jun. 12, 2017); 15 pages.

Anonymous, "Transformer (deep learning architecture)," Wikipedia, first publication date unknown, [last edited Aug. 6, 2025, at 18:15 (UTC)]. Retrieved from https://en.wikipedia.org/wiki/Transformer_ (deep_learning_architecture), [retrieved on Aug. 6, 2025]; 16 pages.
Liu, J. et al., "Target-aware Dual Adversarial Learning and a Multi-scenario Multi-Modality Benchmark to Fuse Infrared and Visible for Object Detection," 2022 IEEE/CVF Conference on Computer Vision and Pattern Recognition (CVPR), New Orleans, LA, USA, [Date of Conference: Jun. 18-24, 2022]; published in IEEE on Sep. 27, 2022, pp. 5792-5801.
Radford, A. et al., "Learning Transferable Visual Models From Natural Language Supervision," arXiv:2103.00020 [cs.CV], Feb. 26, 2021; 48 pages.
Wang, Y. et al., "Infrared and visible Image Fusion with Language-driven Loss in CLIP Embedding Space," arXiv:2402.16267 [cs. CV], Feb. 26, 2024; 9 pages.
Auty, D. et al., "Learning to Prompt CLIP for Monocular Depth Estimation: Exploring the Limits of Human Language," 2023 IEEE/CVF International Conference on Computer Vision Workshops (ICCVW), Paris, France, [Date of Conference: Oct. 2-6, 2023]; published in IEEE on Dec. 25, 2023, pp. 2031-2039.
Girdhar, R. et al., "Imagebind: One Embedding Space to Bind Them All," 2023 IEEE/CVF Conference on Computer Vision and Pattern Recognition (CVPR), Vancouver, BC, Canada, [Date of Conference: Jun. 17-24, 2023]; published in IEEE on Aug. 22, 2023, pp. 15180-15190.
Kim, D. et al., "CLIP Can Understand Depth," arXiv:2402.03251 [cs.CV], Feb. 5, 2024; 12 pages.
Li, X. et al., "From Text to Pixels: A Context-Aware Semantic Synergy Solution for Infrared and Visible Image Fusion," arXiv:2401. 00421 [cs.CV], Dec. 31, 2023; 10 pages.
Lu, Y. et al., "An Alternative of LiDAR in Nighttime: Unsupervised Depth Estimation Based on Single Thermal Image," 2021 IEEE Winter Conference on Applications of Computer Vision (WACV), Waikoloa, HI, USA, [Date of Conference: Jan. 3-8, 2021]; published in IEEE on Jun. 14, 2021, pp. 3832-3842.
Ngiam, J. et al., "Multimodal Deep Learning," ICML'11: Proceedings of the 28th International Conference on International Conference on Machine Learning, Jun. 28, 2011; 8 pages.
U.S. Appl. No. 19/178,636, filed Apr. 14, 2025, by Madani et al.
Zhang, Y. et al., "Meta-Transformer: A Unified Framework for Multimodal Learning," arXiv:2307.10802 [cs.CV], Jul. 20, 2023; 25 pages.
PCT Application No. PCT/US2025/029018, International Search Report and Written Opinion mailed Oct. 22, 2025; Applicant Rivet Industries, Inc.; 10 pages.

* cited by examiner

200

Receive images (e.g., low light images)
202

Apply denoising and/or filtering to images
204

Detect and track objects in images
205

Apply segmentation to images
206

Assign colors to objects in image data based on tracking and segmentation
207

Generate colored output image
208

Modify colored output image based on head pose
210

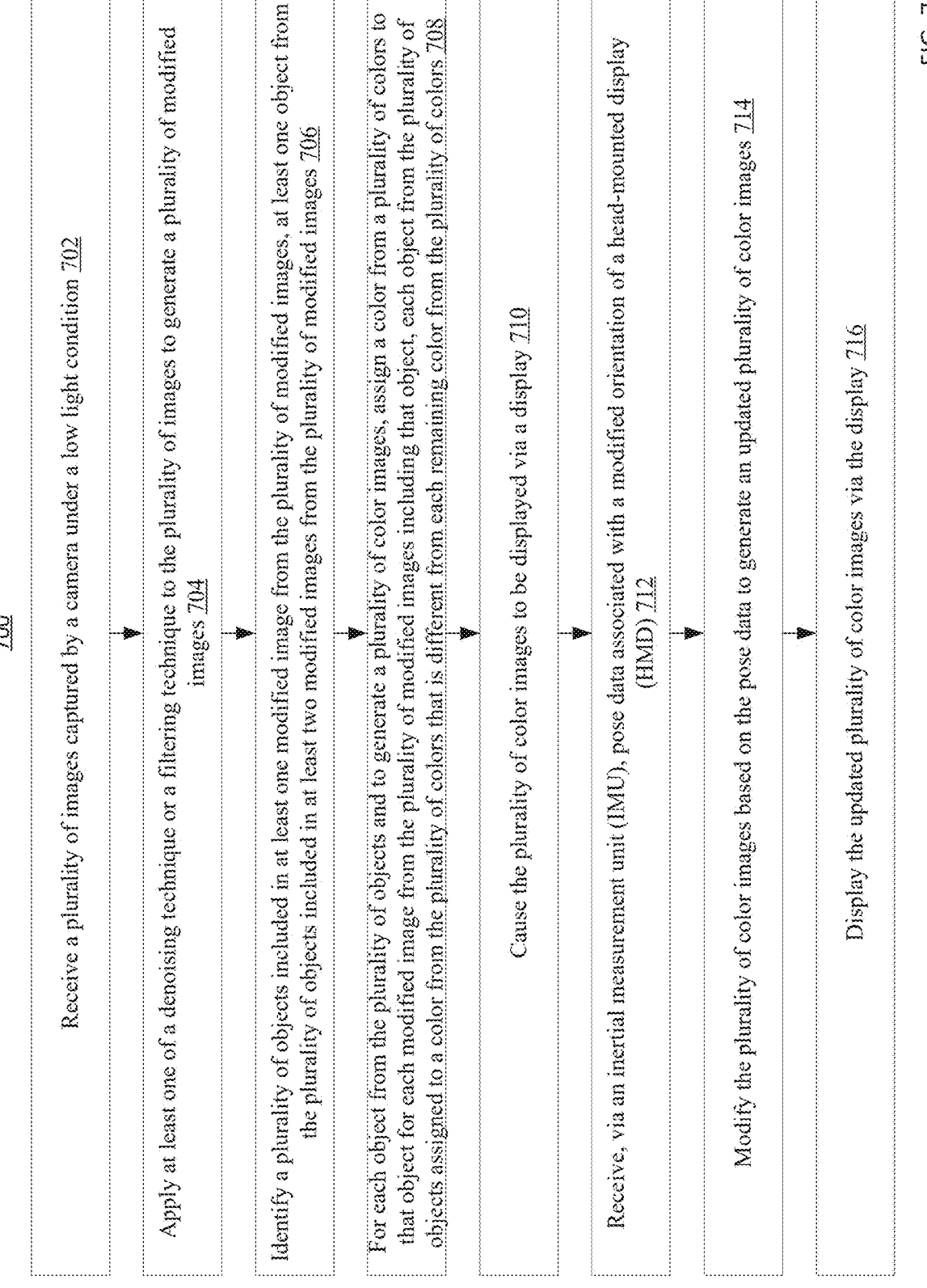

700

Receive a plurality of images captured by a camera under a low light condition 702

Apply at least one of a denoising technique or a filtering technique to the plurality of images to generate a plurality of modified images 704

Identify a plurality of objects included in at least one modified image from the plurality of modified images, at least one object from the plurality of objects included in at least two modified images from the plurality of modified images 706

For each object from the plurality of objects and to generate a plurality of color images, assign a color from a plurality of colors to that object for each modified image from the plurality of modified images including that object, each object from the plurality of objects assigned to a color from the plurality of colors that is different from each remaining color from the plurality of colors 708

Cause the plurality of color images to be displayed via a display 710

Receive, via an inertial measurement unit (IMU), pose data associated with a modified orientation of a head-mounted display (HMD) 712

Modify the plurality of color images based on the pose data to generate an updated plurality of color images 714

Display the updated plurality of color images via the display 716

FIG. 7

800

Receive a first image captured via a head-mounted display (HMD) under a low light condition 802

Apply at least one of a denoising technique or a filtering technique to the first image to generate a first modified image 804

Identify a first object in the first modified image, the first modified image not including a second object 806

In response to determining that the first object does not have a color assignment, assign a first color and not a second color to the first object at the first modified image 808

Receive a second image captured via the HMD under the low light condition 810

Apply the at least one of the denoising technique or the filtering technique to the second image to generate a second modified image 812

Identify (1) the first object in the second modified image and (2) the second object in the second modified image 814

In response to determining that the second object does not have the color assignment, assign the second color and not the first color to the second object at the second modified image 816

In response to determining that the first object is assigned the first color at the first modified image, assign the first color and not the second color to the first object at the second modified image 818

FIG. 8

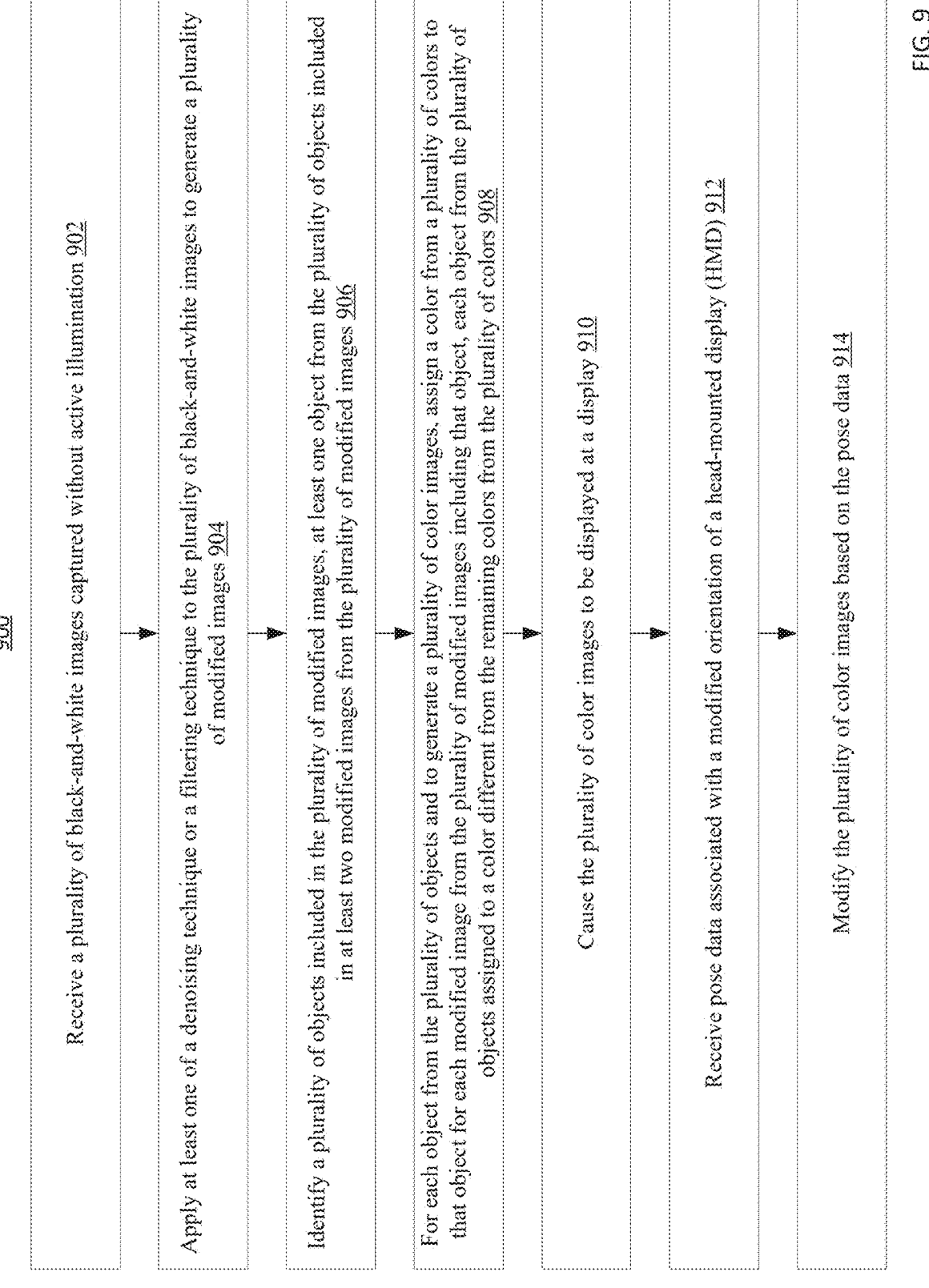

900

Receive a plurality of black-and-white images captured without active illumination 902

Apply at least one of a denoising technique or a filtering technique to the plurality of black-and-white images to generate a plurality of modified images 904

Identify a plurality of objects included in the plurality of modified images, at least one object from the plurality of objects included in at least two modified images from the plurality of modified images 906

For each object from the plurality of objects and to generate a plurality of color images, assign a color from a plurality of colors to that object for each modified image from the plurality of modified images including that object, each object from the plurality of objects assigned to a color different from the remaining colors from the plurality of colors 908

Cause the plurality of color images to be displayed at a display 910

Receive pose data associated with a modified orientation of a head-mounted display (HMD) 912

Modify the plurality of color images based on the pose data 914

FIG. 9

COLOR IMAGERY IN EXTREMELY LOW LIGHT CONDITIONS FOR A HEAD MOUNTED DISPLAY

CROSS REFERENCE TO RELATED APPLICATION

This application claims priority to U.S. Provisional Patent Application No. 63/646,341, filed May 13, 2024 and titled "IMPROVED COLOR IMAGERY IN EXTREMELY LOW LIGHT CONDITIONS FOR A HEAD MOUNTED DIS-PLAY," the contents of which are incorporated by reference herein in its entirety.

FIELD

The present disclosure generally relates to the field of imaging, and in particular, to systems, devices, and methods for processing and/or augmenting image data captured under low light conditions. In some embodiments, such systems, devices, and methods relate to providing color imagery in low light conditions for head mounted displays (HMD).

BACKGROUND

A user of an HMD can experience fatigue due to long exposure to black and white passthrough feed on the environment. But, capturing accurate color within imagery produced by an HMD without active illumination is typically not feasible. Active illumination of dark scenes is often not desirable.

Thus, a need exists to improve color imagery in extremely low light conditions for a head mounted display.

SUMMARY

In an embodiment, a head-mounted display (HMD) includes a processor, a display operatively coupled to the processor, a camera operatively coupled to the processor, an inertial measurement unit (IMU) operatively coupled to the processor, and a memory operatively coupled to the processor. The processor is configured to receive a plurality of images captured by the camera under a low light condition. The processor is further configured to apply at least one of a denoising technique or a filtering technique to the plurality of images to generate a plurality of modified images. The processor is further configured to identify a plurality of objects included in at least one modified image from the plurality of modified images. At least one object from the plurality of objects is included in at least two modified images from the plurality of modified images. The processor is further configured to, for each object from the plurality of objects and to generate a plurality of color images, assign a color from a plurality of colors to that object for each modified image from the plurality of modified images including that object. Each object from that plurality of objects is assigned to a color different from each remaining color from the plurality of colors. The processor is further configured to cause the plurality of color images to be displayed via the display. The processor is further configured to receive, via the IMU, pose data associated with a modified orientation of the HMD. The processor is further configured to modify the plurality of color images based on the pose data to generate an updated plurality of color images. The processor is further configured to display the updated plurality of color images via the display.

In an embodiment, a method includes receiving a first image captured via a head-mounted display (HMD) under a low light condition. The method further includes applying at least one of a denoising technique or a filtering technique to the first image to generate a first modified image. The method further includes identifying a first object in the first modified image. The first modified image does not include a second object. The method further includes, in response to determining that the first object does not have a color assignment, assigning a first color and not a second color to the first object at the first modified image. The method further includes receiving a second image captured via the HMD under the low light condition. The method further includes applying the at least one of the denoising technique or the filtering technique to the second image to generate a second modified image. The method further includes identifying (1) the first object in the second modified image and (2) the second object in the second modified image. The method further includes, in response to determining that the second object does not have the color assignment, assigning the second color and not the first color to the second object at the second modified image. The method further includes, in response to determining that the first object is assigned the first color at the first modified image, assigning the first color and not the second color to the first object at the second modified image.

In an embodiment, a non-transitory processor-readable medium stores code representing instructions to be executed by one or more processors. The instructions comprise code to cause the one or more processors to receive a plurality of black-and-white images captured without active illumination. The instructions further comprise code to cause the one or more processors to apply at least one of a denoising technique or a filtering technique to the plurality of black-and-white images to generate a plurality of modified images. The instructions further comprise code to cause the one or more processors to identify a plurality of objects included in the plurality of modified images. At least one object from the plurality of objects is included in at least two modified images from the plurality of modified images. The instructions further comprise code to cause the one or more processors to, for each object from the plurality of objects and to generate a plurality of color images, assign a color from a plurality of colors to that object for each modified image from the plurality of modified images including that object. Each object from the plurality of objects is assigned to a color different from the remaining colors from the plurality of colors. The instructions further comprise code to cause the one or more processors to cause the plurality of color images to be displayed at a display. The instructions further comprise code to cause the one or more processors to receive pose data associated with a modified orientation of a head-mounted display (HMD). The instructions further comprise code to cause the one or more processors to modify the plurality of color images based on the pose data.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 7 illustrates a flowchart of a method to generate and display color images, according to an embodiment.

FIG. 8 illustrates a flowchart of a method to assign different colors to different objects, according to an embodiment.

FIG. 9 illustrates a flowchart of a method to generate color images based on images captured without active illumination, according to an embodiment.

DETAILED DESCRIPTION

Figure 1:
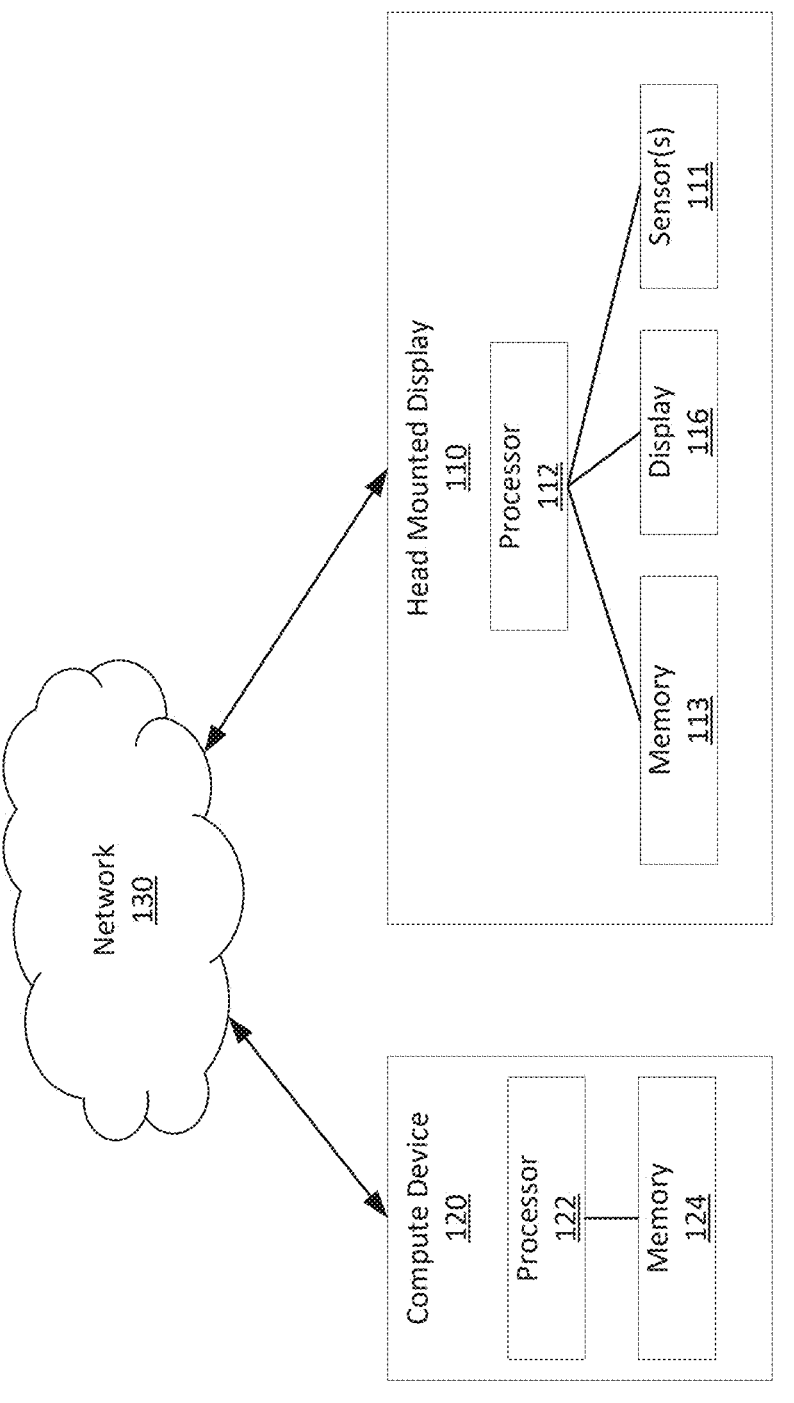
FIG. 1 is a block diagram of a system for a network that includes an HMD, according to some embodiments.

Systems, devices, and methods described herein relate to providing colored image data in low light conditions, e.g., for presentation or display via a head-mounted display (HMD). For example, a user wearing an HMD may perform a mission in an area with a low light condition (e.g., at night, underground, in buildings, etc.), where actively illuminating the area can be undesirable (e.g., where desirable to be undetected). Rather than the user viewing the area through the HMD in black-and-white, which has relatively low contrast/brightness and can fatigue the user, some techniques described herein relate to providing color images to the user through the HMD. Compared to black-and-white images of a scene, color images of the scene can provide the user improved target identification, improved situational awareness, enhanced depth perception, enhanced contrast, and/or the like.

Some implementations are related to receiving images captured by a camera of an HMD. The images could be, for example, video frames captured by the camera of a person wearing the HMD is performing a task. The video frames can be captured at different poses/orientations of the HMD and/or user's head. Objects at the scene can be identified based on the video frames, and different objects can be assigned different colors such that if a given object appears in multiple video frames, that object has the same color in each of those video frames when displayed at the HMD. For example, if a first and second video frame both include the same desk and chair, the HMD can display the desk using a first color (e.g., pink) in the first and second video frames while the HMD can display the chair using a second color (e.g., purple) in the first and second video frames. As an orientation of the HMD modifies, the user can view color images that reflect the modified fields of view.

In some implementations, a "black-and-white image" refers to an image composed solely of shades ranging from black to white, without any color. Also known as a grayscale image, a black-and-white images includes varying intensities of gray to represent different levels of brightness within the scene. In contrast, a "color image" or "colored image" refers to an image that contains colors beyond just black, white, or gray. For example, a color image can include red, green, blue, or a combination thereof.

In some implementations, a "low light condition" refers to an environment with illumination levels below approximately one lux or lumen. In some implementations, a "scene" refers to the visual environment or setting within a camera's field of view at a given time. A scene can encompass, for example, objects, surfaces, lighting conditions, and spatial arrangements present when an image is taken.

Some implementations relate to a panoptic segmentation network to track objects over video frames, enabling color to be added to the frames. For example, a panoptic segmentation network can be configured to detect an object and detect which frames include that object. That object can then be assigned and made the same color in all the frames that include that object. Additionally, or alternatively, denoising techniques can used to brighten the low light images and improve their contrast. A color decoder is fused with low light pixel decoder to improve the spatial resolution of the image. For example, the color decoder can be configured to fill in missing color data and reduce color noise, leading to more accurate and vibrant colors, and the low light pixel decoder can be configured to improve the signal-to-noise ratio (SNR) by using algorithms such as multi-frame noise reduction, pixel binning, or deep learning-based denoising (e.g., this can result in cleaner images with less graininess). Additionally, or alternatively, semantic segmentation can be used to query context relevant colors (e.g., assign pixels representing a first object to a first color, assign pixels representing a second object to a second color, etc.).

FIG. 1 is a block diagram of a system for a network that includes an HMD, according to an embodiment. As shown in FIG. 1, the system includes a head mounted display 110 and a compute device 120, which are coupled together by a communications network 130.

The HMD 110 can be, for example, a display device, worn on the head or as part of a helmet that has a small display optic in front of one eye or each eye. In some embodiments, the HMD 110 is a virtual reality (VR) headset that tracks three-dimensional (3D) position and rotation to provide a virtual environment to the user. Such a virtual reality headset of HMD 110 can be a three-degree of freedom (3DOF) VR headset for example having an inertial measurement unit (IMU) or a six-degree of freedom (6DOF) VR headset for example using sensor fusion from multiple sensors/data sources including at least one IMU. Such IMU and/or multiple sensors are shown in FIG. 1 as sensor(s) 111 of HMD 110. In addition to an IMU, sensor(s) 111 can include for example an accelerometer, a gyroscope, a camera, a red-green-blue (RGB) camera, a low light camera, a thermal imager, a radar sensor, a magnetometer, etc. In some embodiments, the HMD 110 is an augmented reality (AR) device, such as a headset, glasses, goggles, etc. Similar to the VR headset, the AR device can include one or more sensor(s) 111 that can track information regarding the user and/or an environment surrounding the user.

In some embodiments, the sensor(s) 111 can include imaging devices, such as, for example, an optical camera. In some embodiments, the imaging device can be a low light imaging camera. The imaging devices can capture an environment around a user of the HMD. As described herein, under low light conditions, the image data captured by an imaging device can be black-and-white passthrough feed. Long exposure to such image data can be fatiguing for the HMD user. Therefore, it can be desirable to process and/or augment such image data with color, contrast, or other elements for improving object and/or scene differentiation.

HMD 110 can also include a processor 112, a memory 113, a display 116, and a communications interface (not shown). Processor 112 can be coupled to sensor(s) 111, memory 113, display 116, and the communications interface. The processor 112 (e.g., a central processing unit (CPU), a graphics processing unit (GPU), and/or the like) can be, for example, a hardware-based integrated circuit (IC)

or any other suitable processing device configured to run or execute a set of instructions or codes. The memory 113 (e.g., a random-access memory (RAM), a hard drive, a flash drive, and/or the like) of HMD 110 can store data, and/or code that includes instructions to cause the processor 112 to perform one or more processes or functions. The communication interface (e.g., a network interface card (NIC), a Wi-Fi® transceiver, a Bluetooth® transceiver, and/or the like) can be a hardware component that facilitates data communication between HMD 110 and other devices (e.g., the compute device 120, compute devices coupled to communications network 130 but not shown in FIG. 1, and/or the like).

The compute device 120 can include, for example, a memory 124, a processor 122 and a communications interface (not shown). Memory 124, processor 122 and the communications interface of compute device 120 can be similar to the memory 113, processor 112 and the communications interface of HMD 110, respectively. In some embodiments, the processor 122 can execute instructions stored in memory 124 to perform one or more processes and/or functions, including denoising, semantic segmentation and/or classification, object detection and/or tracking, color assignment, etc. For example, with a low light image feed (captured, for example, by an imaging device of the HMD 110), the processor 122 can receive low resolution, black-and-white image data of a scene or environment and process that image data. An example of processing the image data is described below with reference to FIG. 2.

In some embodiments, the compute device 120 can be implemented as a portable device, such as, for example, in the form factor of a puck (such as a hockey puck). The puck can be sufficiently small to fit in a pocket or bag of a user of the HMD 110. In some embodiments, the compute device 120 can be configured to connect directly to the HMD 110, e.g., without the communications network 130. For example, the compute device 120 can connect via wireless connection directly to the HMD 110. By using compute device 120 to perform certain processing rather than HMD 110, memory and/or processing constraints for the HMD 110 can be eased (reduced, lower than otherwise be the case). In some implementations, however, all or some functions performed by compute device 120 can be performed at HMD 110.

Although FIG. 1 illustrates a single HMD (HMD 110), in other implementations, additional HMDs can be used. For example, multiple HMDs can communicate with compute device 120, and compute device 120 can be configured to generate multiple color versions of multiple black-and-white videos captured by the multiple HMDs. For example, a first HMD can send a first black-and-white video captured by the first HMD to compute device 120, a second HMD can send a second black-and-white video captured by the second HMD to compute device 120, compute device 120 can convert the first black-and-white video to a first color video, compute device 120 can convert the second black-and-white video to a second color video, compute device 120 can send the first color video to the first HMD (e.g., and not the second HMD), and compute device 120 can send the second color video to the second HMD (e.g., and not the first HMD).

The communications network 130 can be any suitable communications network for transferring data, operating over public and/or private communications networks. For example, the communications network 130 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the communications network 130 can be a wireless network such as, for example, a Wi-Fi® or wireless local area network ("WLAN"), a wireless wide area network ("WWAN"), and/or a cellular network. In other instances, the communications network 130 can be a wired network such as, for example, an Ethernet network, a digital subscription line ("DSL") network, a broadband network, and/or a fiber-optic network. The communications sent via the communications network 130 can be encrypted or unencrypted. In some instances, the communications network 130 can include multiple networks or subnetworks operatively coupled to one another by, for example, network bridges, routers, switches, gateways and/or the like.

Figure 2:
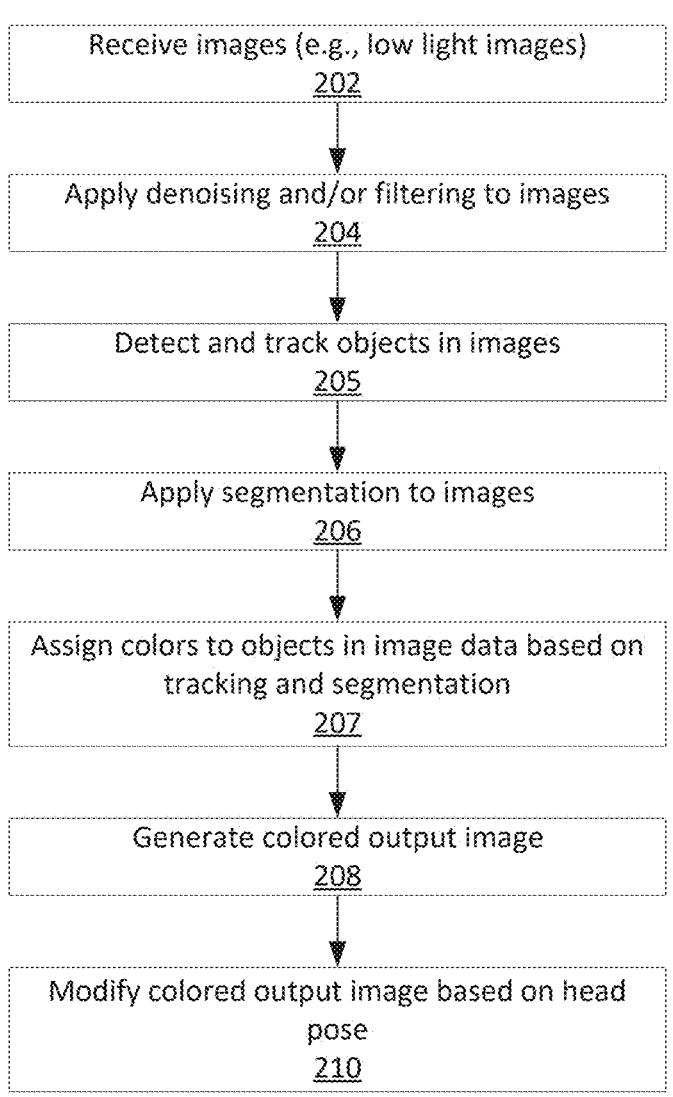
FIG. 2 is a flow chart of a method for processing image data and generating colored images, according to some embodiments.

FIG. 2 depicts a flow chart of an example method 200 of processing images, according to some embodiments. The method 200 can be executed or implemented by a processor (or multiple processors), such as, for example, the processor 122 of compute device 120 and/or the processor 112 of the HMD 110.

At 202, the processor can receive images, such as, for example, images captured (e.g., by a camera of an HMD) under low light conditions (e.g., less than or equal to about 1 lumen or 1 lux). In some embodiments, the images can be sequential frames of an image feed. In some embodiments, the images can be of a scene captured by one or more imaging devices on an HMD being worn by a user. In some implementations, the images are black-and-white. In some implementations, a camera(s) in sensor(s) 111 of HMD 110 captures the images, and the images are sent to compute device 120 over network 130.

At 204, the processor can implement denoising and/or filtering techniques that can brighten low light images (e.g., images received at step 202) and/or improve their contrast. In some embodiments, the denoising and/or filtering techniques can be custom tuned or adapted to a particular scene, expected or predefined level of light, etc. For example, different denoising and/or filtering techniques can be used to enhance contrast of a forest scene as opposed to a building scene. In some embodiments, a list of predefined options for denoising, filtering, or otherwise processing the images can be provided, and a user can select from the list of predefined options. In some embodiments, a user can specify certain information about a scene, e.g., level of light, type of environment, etc., and the processor can be configured to automatically select denoising, filtering, or other processing techniques to clean and/or enhance the contrast in the images. For example, the user can provide an indication of the information about the scene via a user interface at compute device 120 and/or a user interface at HMD 110 (e.g., using a graphical user interface).

At 205, the processor can be configured to detect and track one or more objects in the images. For example, when receiving multiple frames of an image feed, the processor can be configured to track objects across frames. Objects can be tracked across frames using, for example, a mean shift, a Kalman filter, a particle filter, and/or the like.

At 206, the processor can be configured to apply semantic segmentation to the images. For example, the processor can be configured to implement a segmentation algorithm (e.g., neural network, edge detection, etc.) to produce a segmentation output of the images. In some embodiments, the processor can be configured to implement a color decoder and/or a low light pixel decoder, e.g., to improve a spatial resolution of the low light images. In some embodiments, the processor can be configured to implement panoptic segmentation. The segmentation can be configured to identify one or more objects in a scene, such as, for example, a human, a computer, furniture or fixtures (e.g., stove, chair, etc.), a ceiling, a wall, a door, a floor, a sky, a road, etc. In some implementations, an "object" refers to for example a distinct, identifiable entity within a scene that possesses boundaries and can be visually or computationally segmented from its surroundings based on characteristics such as color, texture, shape, depth, and/or the like.

At 207, the processor can be configured to assign colors to the objects in the image data based on the object tracking and segmentation. For example, objects already being tracked across frames can be colored based on previously assigned color(s) to that object. New objects in a segmentation output can be assigned a color (e.g., a color not previously assigned or a previously-assigned color at used a non-continuous location within images), and tracked across subsequent frames. The color can be assigned based on real-world color (e.g., a green color can be assigned to a plant) and/or not based on real-world color (e.g., a pink color assigned to a tree). Even when not based on real-world color, the colors assigned to the objects in the image data can reduce fatigue and improve or enhance what is shown in the images. In some implementations, an identity at least some objects in a frame can be predicted, and a color can be assigned to those objects based on a prediction of what that object is. The color can be assigned to, for example, indicate a dangerous object, indicate objects of interest, replicate a color of that object from the real-world, and/or the like. For example, threats can be colored red to indicate danger, objects having the shape of a tree can be colored brown or green to reflect tress in real life that are brown or green, and/or the like.

At 208, the processor can be configured to generate a colored output image or images. In some embodiments, the output image can be presented to a user, such as a user of an HMD. In some embodiments, a user wearing an HMD may capture images that are fed to the processor (e.g., processor 112 of HMD 110), at 202, and undergo the processing, at 204-207. The processor can generate the colored output image, at 208, which can be transmitted to the HMD for displaying to the user (e.g., via display 116 of HMD 110). The colored output image or images can have more spectral diversity, more contrast, and/or more brightness than the images from 202.

At 209, the processor can be configured to modify the colored output image based on a pose of the head of the user. For example, the user may be wearing an HMD, such as, for example HMD 110. The HMD may include one or more sensors (e.g., sensor(s) 111), which can detect a head pose of the user. The HMD can then modify or re-render the colored output image for displaying to the user based on the head pose of the user. Such can ensure that the output image data that is presented to the user is accurately placed in a real-world scene (e.g., in the context of a MR environment).

Figure 3:
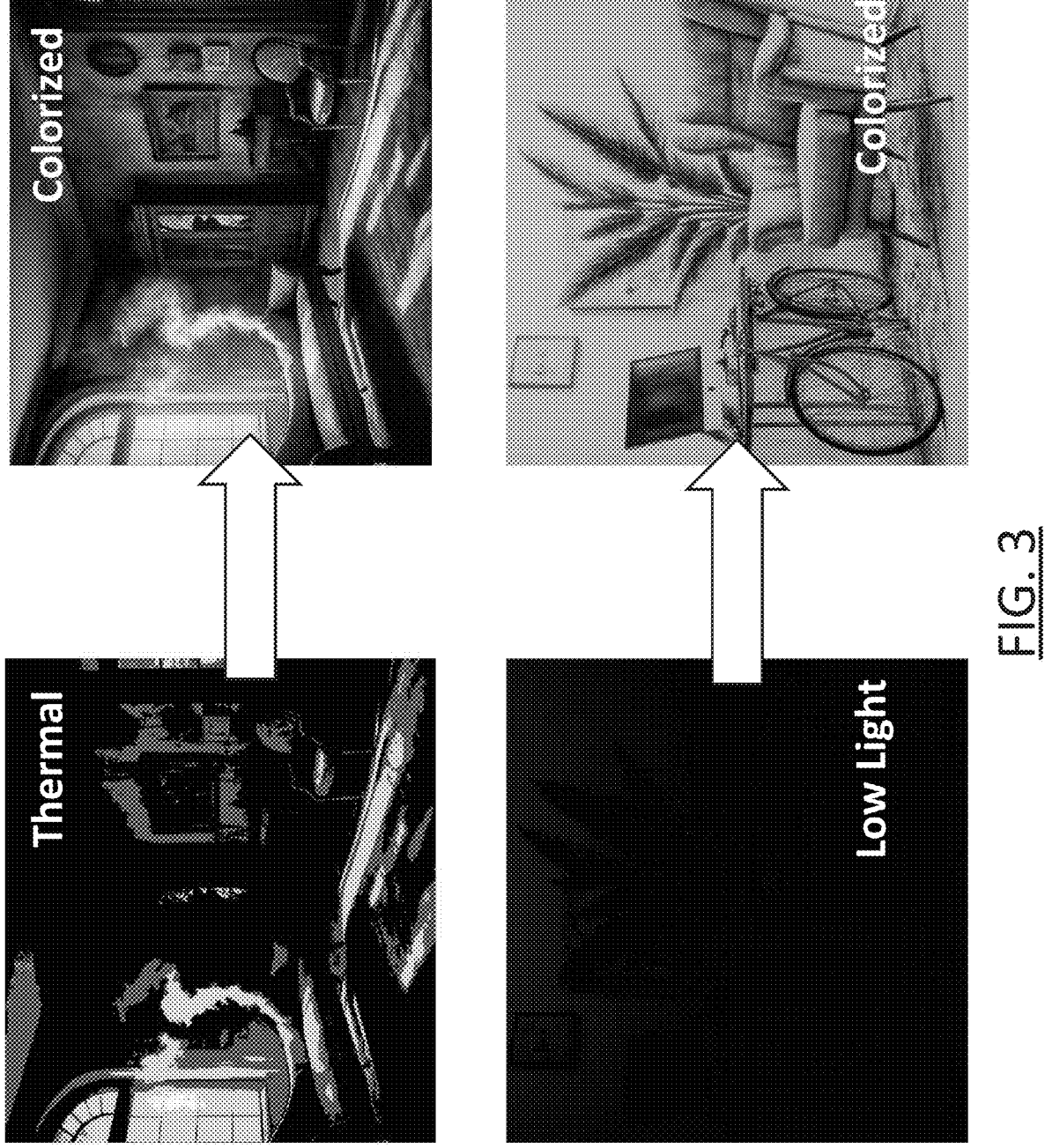
FIG. 3 depicts examples of color being added to a thermal image and a low-light image, according to embodiments.

In extremely low light conditions (e.g., close to 0 lux), systems, devices, and methods described herein can be configured to colorize (e.g., add color) to image modalities including, for example, low light, complementary metal oxide-semiconductor (CMOS) sensors, avalanche photodiodes (APDs), single photon avalanche photodiodes (SPAD) sensors, thermal sensors, etc. Such sensors can be integrated into, for example, the HMDs as described herein, including HMD 110. FIG. 3 depicts examples of color being added to images captured using a thermal sensor and a low-light CMOS sensor. In some embodiments, the HMDs and other compute devices (e.g., HMD 110, compute device 120, etc.) can be implemented using lower power.

Figure 4:
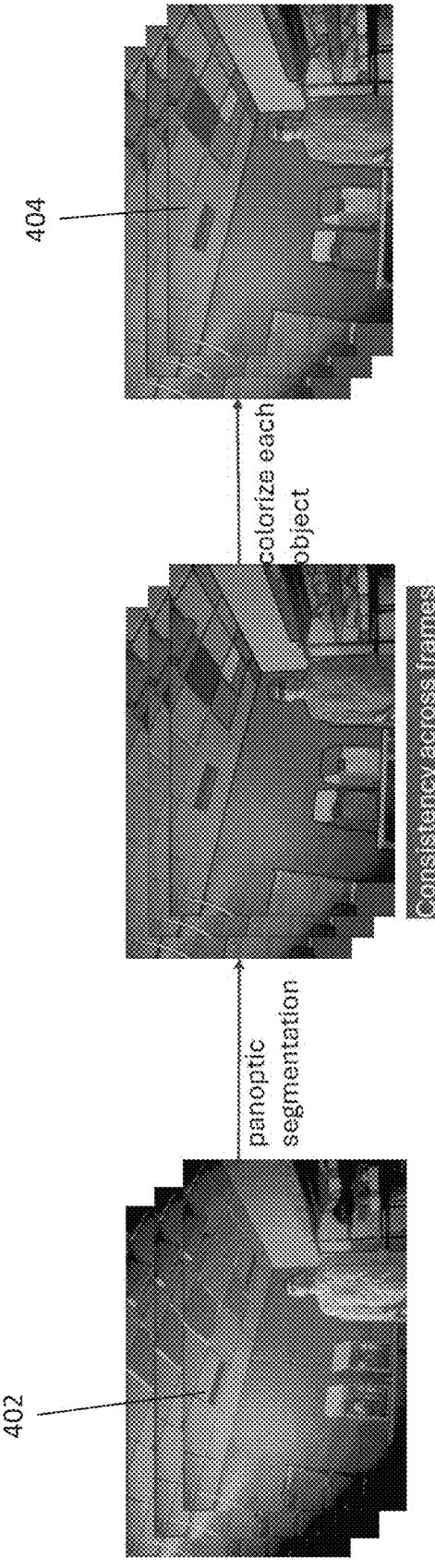
FIG. 4 illustrates an example of consistently coloring objects across images, according to an embodiment.

FIG. 4 illustrates an example of consistently coloring objects across images, according to an embodiment. Images 402 can be captured by a camera (e.g., from sensor(s) 111). Images 402 can be, for example, frames of a video. Panoptic segmentation can be performed to identify objects included in images 402, and to identify in which image(s) from images 402 each identified object appears. To generate images 404, a color can also be assigned to each object, and that color can assigned as the designated color for that object across any and all images from images 402 that include that object. For example, if a container is included in all images from images 402, that container can appear blue in all images from images 404. In some implementations, the spectral diversity, brightness, and/or contrast for images 404 is greater than the spectral diversity, brightness, and/or contrast for images 402.

Figure 5:
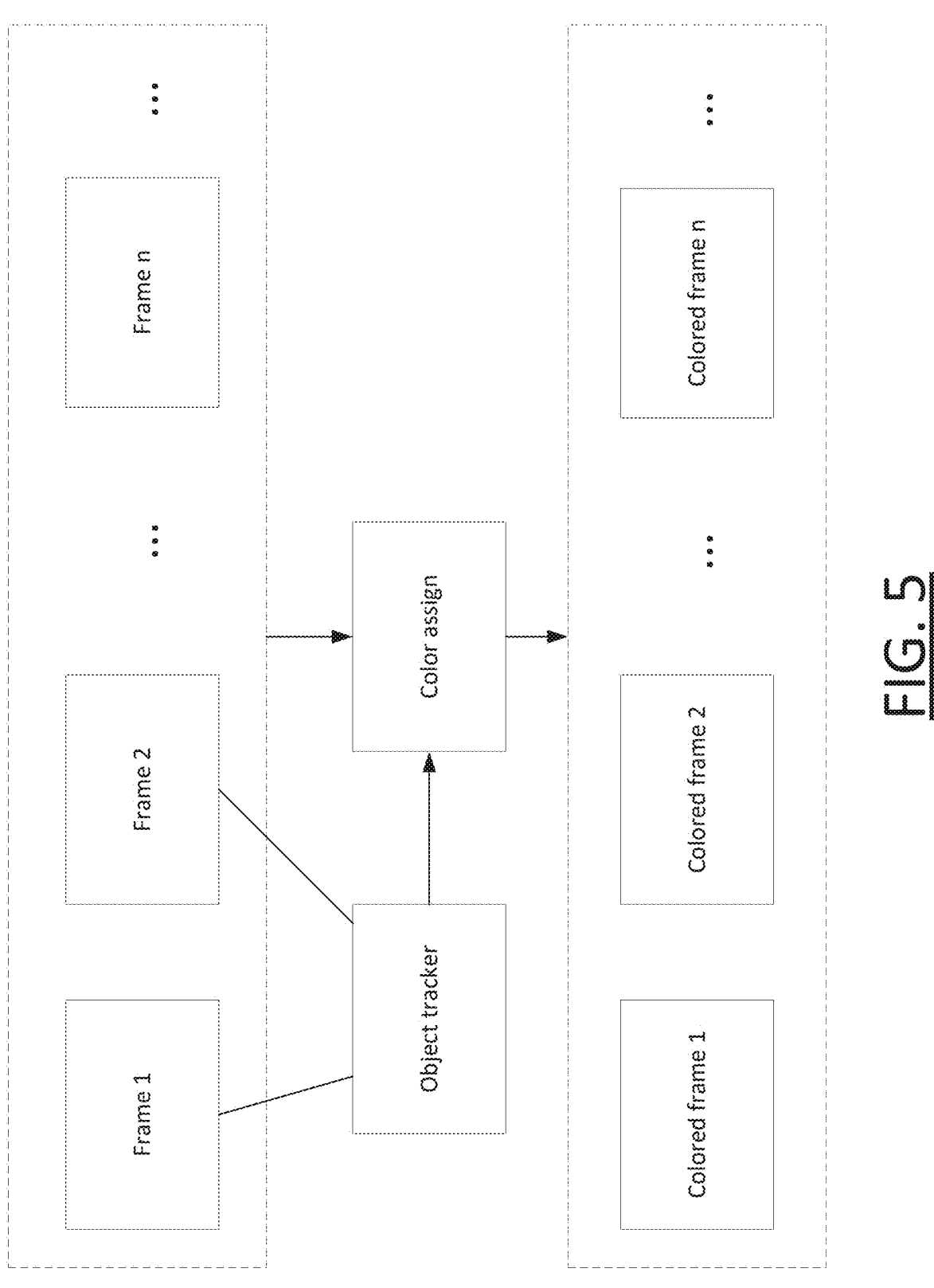
FIG. 5 is a schematic diagram that illustrates tracking objects and assigning colors to objects, according to an embodiment.

FIG. 5 is a schematic diagram that illustrates tracking objects and assigning colors to objects, according to an embodiment. Frame 1 through frame n can represent images captured by an HMD (e.g., and received at compute device 120 from HMD 110) under low light conditions. An object tracker (e.g., performed by processor 122) can identify objects in frame 1 through frame n and determine which frames from frame 1 through frame n include that object. For each identified object, a color assigner (e.g., performed by processor 122) can assign that object to a unique color (e.g., such that each identified object is assigned a color that is different from other identified objects), and all instances of that object in frame 1 through frame n can be transformed into the assigned color to generate colored frame 1 through frame n. In some implementations, the color assigner is a flooding or neural network (e.g., that is accessible by processor 122). In some implementations, colored frames are generated in a temporal matter. For example, colored frames can be generated (or at least begin the process to be generated) in real time as frames are received. For example, colored frame 1 can be generated in response to receiving frame 1 (in black-and-white) and without waiting for frame 2 (in-black-and-white) to be received.

Figure 6:
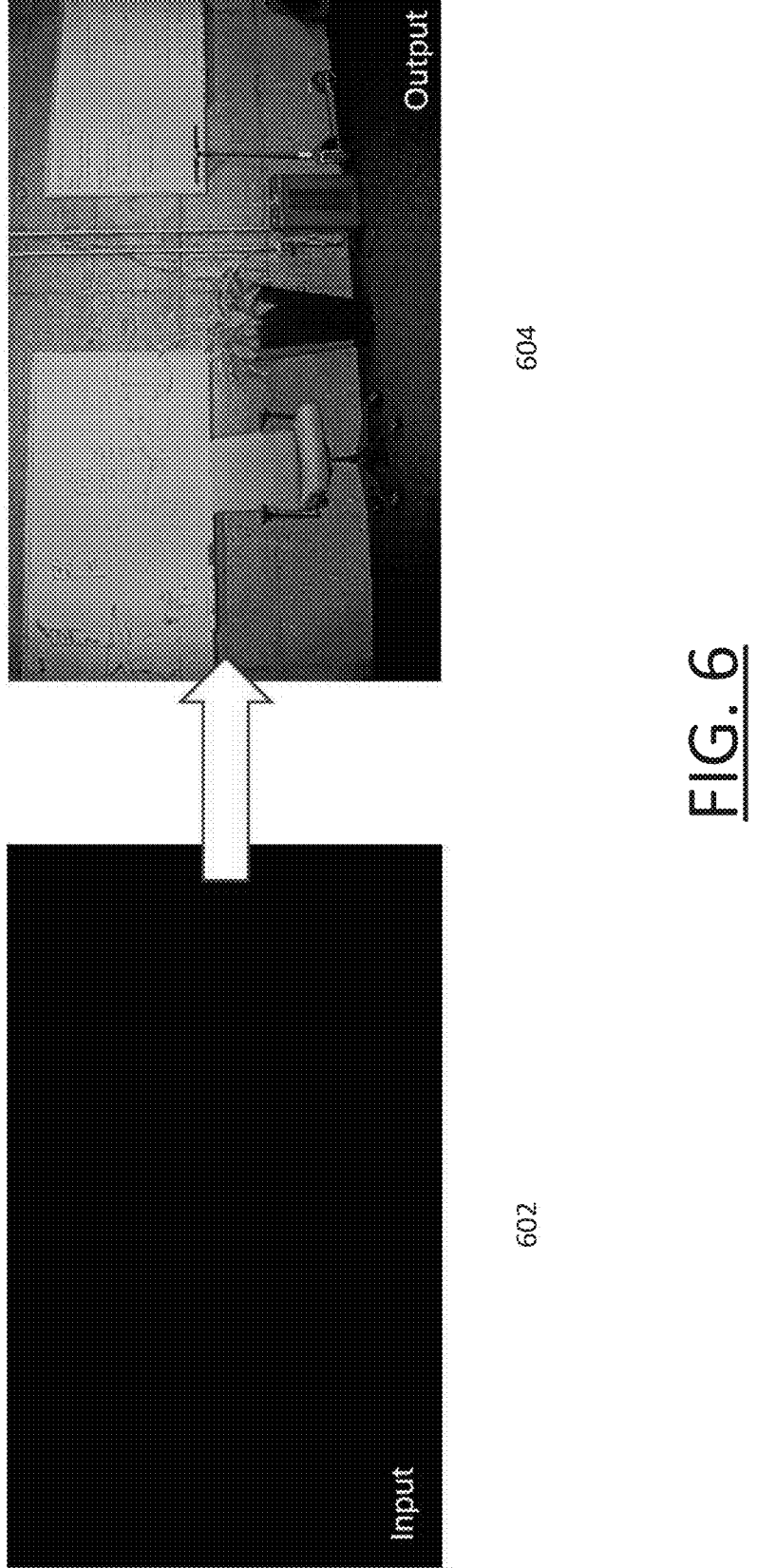
FIG. 6 illustrates an example of an initial image and a transformed image, according to an embodiment.

FIG. 6 illustrates an example of an initial image and a transformed image, according to an embodiment. Image 602 is an example of an image captured by an HMD in a low light condition, and image 604 is a transformed version of the image. Objects within image 602 are identified, and unique colors are assigned to those objects to generate image 604. As illustrated, image 604 has more spectral diversity, brightness, and contrast than image 602. In some implementations, compute device 120 receives image 602 from HMD 110, generates image 604, and sends image 604 back to HMD 110 such that HMD 110 displays image 604 instead of image 602 at display 116.

FIG. 7 illustrates a flowchart of a method 700 to generate and display color images, according to an embodiment. In some implementations, method 700 is executed by a processor (e.g., processor 122 and/or 112).

At 702, a plurality of images captured by a camera under a low light condition are received. For example, a camera at sensor(s) 111 of HMD 110 can capture the plurality of images, and sends the plurality of images to processor 112 and/or processor 122 via network 130.

At 704, at least one of a denoising technique or a filtering technique is applied to the plurality of images to generate a plurality of modified images. In some implementations, the plurality of modified images has less noise and/or more contrast than the plurality of images. In some implementations, 704 is performed automatically (e.g., without human intervention) in response to completing 702.

At 706, a plurality of objects included in at least one modified image from the plurality of modified images are identified. At least one object from the plurality of objects is included in at least two modified images from the plurality of modified images. In some implementations, the at least two modified images are consecutive frames from a video, non-consecutive frames from the video, or a combination thereof. In some implementations, 706 is performed automatically (e.g., without human intervention) in response to completing 704.

At 708, for each object from the plurality of objects and to generate a plurality of color images, a color from a plurality of colors is assigned to that object for each modified image from the plurality of modified images including that object. Each object from the plurality of objects is assigned to a color from the plurality of colors that is different from each remaining color from the plurality of colors. For example, if the plurality of objects has X different objects, the plurality of colors has X different colors (where X is a positive integer greater than one). In some implementations, colors are assigned to the objects such that objects that are directly adjacent to each other are assigned colors with a contrast ratio greater than a predetermined threshold; for example, rather than assign a wall to be royal blue and a door at the wall to be powder blue, the wall can be red and the door can be green. In some implementations, 708 is performed automatically (e.g., without human intervention) in response to completing 706.

At 710, the plurality of color images are caused to be displayed via a display (e.g., display 116). For example, if the plurality of color images is generated at compute device 120, an electronic signal representing the plurality of color images can be sent to HMD 110; in response to receiving the electronic signal, HMD 110 can display the plurality of color images at display 116. As another example, if the plurality of color images is generated at HMD 110, processor 112 can send the plurality of color images to display 116 for display. In some implementations, 710 is performed automatically (e.g., without human intervention) in response to completing 708.

At 712, pose data associated with a modified orientation of a head-mounted display (HMD) (e.g., HMD 110) is received via an inertial measurement unit (IMU). For example, head movement of a user wearing HMD 110 can cause the modified orientation, and a representation of the pose data can be sent from HMD 110 to compute device 120. In some implementations, 712 is performed automatically (e.g., without human intervention) in response to completing 710.

At 714, the plurality of color images is modified based on the pose data to generate an updated plurality of color images. For example, due to the modified orientation of the HMD, different objects can appear, previously-displayed objects can cease to be displayed, and/or objects can be viewed in a different orientation; the updated plurality of color images can reflect those differences from the modified orientation while still maintaining color consistency of objects across frames (e.g., such that an object in a prior image does not have a different color in a subsequent image). In some implementations, 714 is performed automatically (e.g., without human intervention) in response to completing 712.

At 716, the updated plurality of color images is displayed via a display (e.g., display 116). For example, if the updated plurality of color images is generated at compute device 120, an electronic signal representing the updated plurality of color images can be sent to HMD 110. In response to receiving the electronic signal, HMD 110 can display the updated plurality of color images at display 116. In some implementations, 716 is performed automatically (e.g., without human intervention) in response to completing 714.

In some implementations of method 700, the HMD is a three-degree of freedom (3DOF) virtual reality headset. In some implementations of method 700, the HMD is a six-degree of freedom (6DOF) virtual reality headset.

In some implementations of method 700, the plurality of images are black-and-white images. In some implementations of method 700, an illuminance of the low light condition is not more than at least one of one lumen or one lux.

In some implementations of method 700, the plurality of images is associated with a first brightness and the plurality of modified images are associated with a second brightness higher than the first brightness. In some implementations of method 700, the plurality of images is associated with a first contrast and the plurality of modified images are associated with a second contrast greater than the first contrast.

Some implementations of method 700 further include determining a scene associated with the plurality of images and determining the at least one of the denoising technique or the filtering technique based on the scene. For example, the scene being or including a first type of scene can cause a first type of denoising or filtering technique to occur, while the scene being or including a second type of scene can cause a second type of denoising or filtering technique to occur.

In some implementations of method 700, the plurality of images is associated with a scene and method 700 further includes receiving user input indicating a set of attributes associated with the scene. The set of attributes can include at least one of a light level or an environment type. Method 700 can further include determining, before applying the at least one of the denoising technique or the filtering technique at 704, the at least one of the denoising technique or the filtering technique based on the set of attributes associated with the scene. For example, a first type of denoising technique or filtering technique can be used if the light level is within a first predetermined range or the environment type is a first environment type, and a second type of denoising technique or filtering technique can be used if the light level is within a second predetermined range or the environment type is a second environment type.

Some implementations of method 700 further include, when identifying the plurality of objects included in the plurality of modified images at 706, applying semantic segmentation to the plurality of modified images. Some implementations of method 700 further include, when identifying the plurality of objects included in the plurality of modified images, applying panoptic segmentation to the plurality of modified images.

FIG. 8 illustrates a flowchart of a method 800 to assign different colors to different objects, according to an embodiment. In some implementations, method 800 is executed by a processor (e.g., processor 122 and/or 112).

At 802, a first image captured via a head-mounted display (HMD) under a low light condition is received. For example, a camera at sensor(s) 111 can capture the first image, and the first image can be sent from HMD 110 to compute device 120.

At 804, at least one of a denoising technique or a filtering technique is applied to the first image to generate a first modified image. In some implementations, 804 occurs automatically (e.g., without human intervention) in response to completing 802.

At 806, a first object is identified in the first modified image. The first modified image does not include a second object. In some implementations, 806 occurs automatically (e.g., without human intervention) in response to completing 804.

At 808, in response to determining that the first object does not have a color assignment, a first color and not a second color is assigned to the first object at the first modified image. In some implementations, 808 occurs automatically (e.g., without human intervention) in response to completing 806.

At 810, a second image captured via the HMD under the low light condition is received. For example, the camera at sensor(s) 111 can capture the second image, and the second image can be sent from HMD 110 to compute device 120. The second image and the first image can be captured using the same camera or different cameras. In some implementations, 810 occurs automatically (e.g., without human intervention) in response to completing 808.

At 812, the at least one of the denoising technique or the filtering technique is applied to the second image to generate a second modified image. In some implementations, 812 occurs automatically (e.g., without human intervention) in response to completing 810.

At 814, (1) the first object in the second modified image and (2) the second object in the second modified image are identified. In some implementations, the first object is at a first location in the first modified image and the first object is at a second location in the second modified image different than the first location. For example, capturing images of the first object moving in real life can cause the first object to be at different locations in the images. For example, for a vehicle moving from right to left within the field of view of a camera, the vehicle can appear at a first location on the right side of the image at a first time and can appear at a second location on the left side of the image at a second time. In some implementations, 814 occurs automatically (e.g., without human intervention) in response to completing 812.

At 816, in response to determining that the second object does not have the color assignment, the second color and not the first color is assigned to the second object at the second modified image. That way, the two different objects—the first object and the second object—have different assigned colors. In some implementations, 816 occurs automatically (e.g., without human intervention) in response to completing 814.

At 818, in response to determining that the first object is assigned the first color at the first modified image, the first color and not the second color is assigned to the first object at the second modified image. That way, the first object has a consistent color assignment—the first color—across multiple images that include the first object. In some implementations, 818 occurs automatically (e.g., without human intervention) in response to completing 814 and/or 816.

In some implementations, the first image is captured when the HMD is at a first orientation and the second image is captured when the HMD is at a second orientation different than the first orientation. For example, head movement by a user wearing the HMD can cause the HMD to be in the first and second orientations.

Some implementations of method 800 further include receiving a third image captured via the HMD under the low light condition. The at least one of the denoising technique or the filtering technique is applied to the third image to generate a third modified image, and the following are identified: (1) the first object in the third modified image; (2) the second object in the third modified image; and (3) a third object in the third modified image. In response to determining that the third object does not have the color assignment, a third color and not the first color or the second color is assigned to the third object at the third modified image. In response to determining that the first object is assigned the first color at least one of the first modified image or the second modified image, the first color and not the second color or the third color is assigned to the first object at the third modified image. In response to determining that the second object is assigned the second color at the second modified image, the second color and not the first color or the third color is assigned to the second object at the third modified image. In some implementations, the third image is captured at a later point in time that the first image and the second image.

Some implementations of method 800 further include receiving a third image captured via the HMD under the low light condition. The third image does not include the first object and the second object. The at least one of the denoising technique or the filtering technique is applied to the third image to generate a third modified image. A third object is identified in the third modified image. In response to determining that the third object does not have the color assignment, a third color and not the first color or the second color is assigned to the third object at the third modified image.

In some implementations of method 800, the first image is of a first scene, the second image is of the first scene, the at least one of the denoising technique or the filtering technique is at least one of a first denoising technique or a first filtering technique, and method 800 further includes receiving a third image captured via the HMD under the low light condition. The third image can be of a second scene different than the first scene. At least one of a second denoising technique or a second filtering technique is applied to the third image to generate a third modified image. A third object is identified in the third modified image. In response to determining that the third object does not have the color assignment, a third color is assigned to the third object at the third modified image.

In some implementations of method 800, the first object has an actual color at a scene that includes the first object, and the first color assigned to the first object is not the actual color. For example, the actual color of a plant can be green, but the first color can be a color other than green.

FIG. 9 illustrates a flowchart of a method 900 to generate color images based on images captured without active illumination, according to an embodiment. In some implementations, method 900 is executed by a processor (e.g., processor 122 and/or 112).

At 902, a plurality of black-and-white images captured without active illumination are received. For example, a camera at sensor(s) 111 of HMD 110 can capture black-and-white images of a scene that has low light conditions, and send those captured images to compute device 120 via network 130.

At 904, at least one of a denoising technique or a filtering technique is applied to the plurality of black-and-white images to generate a plurality of modified images. In some implementations, 904 occurs automatically (e.g., without human intervention) in response to completing 902.

At 906, a plurality of objects included in the plurality of modified images are identified. At least one object from the plurality of objects is included in at least two modified images from the plurality of modified images. In some implementations, 906 occurs automatically (e.g., without human intervention) in response to completing 904.

At 908, for each object from the plurality of objects and to generate a plurality of color images, a color from a plurality of colors is assigned to that object for each modified image from the plurality of modified images including that object. Each object from the plurality of objects is assigned to a color different from the remaining colors from the plurality of colors. In some implementations, 908 occurs automatically (e.g., without human intervention) in response to completing 906.

At 910, the plurality of color images is caused to be displayed at a display (e.g., display 116). For example, an electronic signal representing the plurality of color images can be sent from compute device 120 to HMD 110 via HMD, and HMD 110 can display the plurality of color images (e.g., in a video sequence) at display 116. In some implementations, 910 occurs automatically (e.g., without human intervention) in response to completing 908.

At 912, pose data associated with a modified orientation of a head-mounted display (HMD) is received. For example, pose data can be captured by sensor(s) 111 and a representation of the pose data can be sent from HMD 110 to compute device 120.

At 914, the plurality of color images is modified based on the pose data. For example, the plurality of color images can reflect modified angles, distances, sizes, and other factors to represent a change(s) in the field of view (as reflected in the pose data). In some implementations, 914 occurs automatically (e.g., without human intervention) in response to completing 912.

In some implementations of method 900, (1) the plurality of black-and-white images are associated with a first brightness and the plurality of modified images are associated with a second brightness greater than the first brightness and (2) the plurality of black-and-white images are associated with a first contrast and the plurality of modified images are associated with a second contrast greater than the first contrast.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or" as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A head-mounted display (HMD), comprising:
a processor;
a display operatively coupled to the processor;
a camera operatively coupled to the processor;
an inertial measurement unit (IMU) operatively coupled to the processor; and
a memory operatively coupled to the processor, the processor configured to:
receive a plurality of images captured by the camera under a low light condition;

apply at least one of a denoising technique or a filtering technique to the plurality of images to generate a plurality of modified images;
identify a plurality of objects included in at least one modified image from the plurality of modified images, at least one object from the plurality of objects included in at least two modified images from the plurality of modified images;
for each object from the plurality of objects and to generate a plurality of color images, assign a color from a plurality of colors to that object for each modified image from the plurality of modified images including that object, each object from the plurality of objects assigned to a color from the plurality of colors that is different from each remaining color from the plurality of colors;
cause the plurality of color images to be displayed via the display;
receive, via the IMU, pose data associated with a modified orientation of the HMD;
modify the plurality of color images based on the pose data to generate an updated plurality of color images that maintain color consistency of objects from the plurality of objects across the updated plurality of color images; and
display the updated plurality of color images via the display.

2. The HMD of claim 1, wherein the HMD is a three-degree of freedom (3DOF) virtual reality headset.

3. The HMD of claim 1, wherein the HMD is a six-degree of freedom (6DOF) virtual reality headset.

4. The HMD of claim 1, wherein the plurality of images are black-and-white images.

5. The HMD of claim 1, wherein an illuminance of the low light condition is not more than at least one of one lumen or one lux.

6. The HMD of claim 1, wherein the plurality of images are associated with a first brightness and the plurality of modified images are associated with a second brightness higher than the first brightness.

7. The HMD of claim 1, wherein the plurality of images are associated with a first contrast and the plurality of modified images are associated with a second contrast greater than the first contrast.

8. The HMD of claim 1, wherein the processor is further configured to:
determine a scene associated with the plurality of images; and
determine the at least one of the denoising technique or the filtering technique based on the scene.

9. The HMD of claim 1, wherein the plurality of images are associated with a scene and the processor is further configured to:
receive user input indicating a set of attributes associated with the scene, the set of attributes including at least one of a light level or an environment type; and
determine, before applying the at least one of the denoising technique or the filtering technique, the at least one of the denoising technique or the filtering technique based on the set of attributes associated with the scene.

10. The HMD of claim 1, wherein the processor is configured to, when identifying the plurality of objects included in the plurality of modified images:
apply semantic segmentation to the plurality of modified images.

11. The HMD of claim 1, wherein the processor is configured to, when identifying the plurality of objects included in the plurality of modified images:

apply panoptic segmentation to the plurality of modified images.

12. A method, comprising:

receiving a first image of a first scene captured via a head-mounted display (HMD) under a low light condition;

applying at least one of a first denoising technique or a first filtering technique to the first image to generate a first modified image;

identifying a first object in the first modified image, the first modified image not including a second object;

in response to determining that the first object does not have a color assignment, assigning a first color and not a second color to the first object at the first modified image;

receiving a second image of the first scene captured via the HMD under the low light condition;

applying the at least one of the first denoising technique or the first filtering technique to the second image to generate a second modified image;

identifying (1) the first object in the second modified image and (2) the second object in the second modified image;

in response to determining that the second object does not have the color assignment, assigning the second color and not the first color to the second object at the second modified image;

in response to determining that the first object is assigned the first color at the first modified image, assigning the first color and not the second color to the first object at the second modified image;

receiving a third image captured via the HMD under the low light condition, the third image of a second scene different than the first scene;

applying at least one of a second denoising technique or a second filtering technique to the third image to generate a third modified image;

identifying a third object in the third modified image; and in response to determining that the third object does not have the color assignment, assigning a third color to the third object at the third modified image.

13. The method of claim 12, wherein the first object is at a first location in the first modified image and the first object is at a second location in the second modified image different than the first location.

14. The method of claim 12, wherein the first image is captured when the HMD is at a first orientation and the second image is captured when the HMD is at a second orientation different than the first orientation.

15. The method of claim 12, further comprising:

receiving a fourth image captured via the HMD under the low light condition;

applying the at least one of the denoising technique or the filtering technique to the fourth image to generate a fourth modified image;

identifying (1) the first object in the fourth modified image and (2) the second object in the fourth modified image and (3) a fourth object in the fourth modified image;

in response to determining that the fourth object does not have the color assignment, assigning a fourth color and not the first color or the second color to the fourth object at the fourth modified image;

in response to determining that the first object is assigned the first color at least one of the first modified image or the second modified image, assigning the first color and not the second color or the fourth color to the first object at the fourth modified image; and in response to determining that the second object is assigned the second color at the second modified image, assigning the second color and not the first color or the fourth color to the second object at the fourth modified image.

16. The method of claim 12, further comprising:

receiving a fourth image captured via the HMD under the low light condition, the fourth image not including the first object and the second object;

applying the at least one of the denoising technique or the filtering technique to the fourth image to generate a fourth modified image;

identifying a fourth object in the fourth modified image; and in response to determining that the fourth object does not have the color assignment, assigning a fourth color and not the first color or the second color to the fourth object at the fourth modified image.

17. The method of claim 12, wherein the first object has an actual color at a scene that includes the first object, and the first color assigned to the first object is not the actual color.

18. A non-transitory processor-readable medium storing code representing instructions to be executed by one or more processors, the instructions comprising code to cause the one or more processors to:

receive a plurality of black-and-white images captured without active illumination;

apply at least one of a denoising technique or a filtering technique to the plurality of black-and-white images to generate a plurality of modified images;

identify a plurality of objects included in the plurality of modified images, at least one object from the plurality of objects included in at least two modified images from the plurality of modified images;

for each object from the plurality of objects and to generate a plurality of color images, assign a color from a plurality of colors to that object for each modified image from the plurality of modified images including that object, each object from the plurality of objects assigned to a color different from the remaining colors from the plurality of colors;

cause the plurality of color images to be displayed at a display;

receive pose data associated with a modified orientation of a head-mounted display (HMD); and modify the plurality of color images based on the pose data to generate an updated plurality of color images that maintain color consistency of objects from the plurality of objects across the updated plurality of color images.

19. The non-transitory processor-readable medium of claim 18, wherein (1) the plurality of black-and-white images are associated with a first brightness and the plurality of modified images are associated with a second brightness greater than the first brightness and (2) the plurality of black-and-white images are associated with a first contrast and the plurality of modified images are associated with a second contrast greater than the first contrast.

* * * * *